(12) United States Patent
Schafer, Jr. et al.

(10) Patent No.: US 7,962,259 B2
(45) Date of Patent: Jun. 14, 2011

(54) CABIN SERVICES SYSTEM FOR A MOBILE PLATFORM

(75) Inventors: Roland L Schafer, Jr., Auburn, WA (US); Phillip S Mattson, Bothell, WA (US); Gerald D Lui-Kwan, Kent, WA (US)

(73) Assignee: The Boeing Company, Chicago, IL (US)

( * ) Notice: Subject to any disclaimer, the term of this patent is extended or adjusted under 35 U.S.C. 154(b) by 956 days.

(21) Appl. No.: 11/297,560

(22) Filed: Dec. 8, 2005

(65) Prior Publication Data

US 2006/0095162 A1 May 4, 2006

Related U.S. Application Data

(63) Continuation-in-part of application No. 10/670,952, filed on Sep. 25, 2003, now abandoned.

(51) Int. Cl.
| B64D 11/00 | (2006.01) |
| B64D 11/06 | (2006.01) |
| H04N 7/16 | (2006.01) |
| H04N 7/173 | (2006.01) |

(52) U.S. Cl. ............... 701/36; 700/19; 700/83; 700/94; 700/275; 701/14; 701/207

(58) Field of Classification Search ............... 244/75, 244/118.5, 175; 340/945, 971; 701/3, 4, 701/14, 36; 398/66; 455/321; 725/76–77, 725/87

See application file for complete search history.

(56) References Cited

U.S. PATENT DOCUMENTS

| 4,282,870 | A |   | 8/1981  | Porlier |
| 4,472,780 | A |   | 9/1984  | Chenoweth et al. |
| 4,490,794 | A |   | 12/1984 | Griffith et al. |
| 5,529,265 | A |   | 6/1996  | Sakurai |
| 5,677,603 | A |   | 10/1997 | Speirs et al. |
| 5,896,473 | A |   | 4/1999  | Kaspari |
| 5,971,623 | A |   | 10/1999 | Wanamaker |
| 5,973,722 | A | * | 10/1999 | Wakai et al. ............. 725/76 |
| 6,131,119 | A | * | 10/2000 | Fukui .................. 709/224 |
| 6,208,307 | B1 | * | 3/2001 | Frisco et al. ............. 343/757 |
| 6,266,815 | B1 | * | 7/2001 | Shen et al. .............. 725/76 |
| 6,308,116 | B1 |   | 10/2001 | Ricks et al. |
| 6,356,809 | B1 |   | 3/2002  | Morrison et al. |

(Continued)

OTHER PUBLICATIONS

The Microsoft Press Computer Dictionary, 3rd Edition, Microsoft Press, Redmond, WA: Microsoft Press, 1997, pp. 154 and 437.*

(Continued)

*Primary Examiner* — Khoi Tran
*Assistant Examiner* — Dale Moyer
(74) *Attorney, Agent, or Firm* — Harness, Dickey & Pierce, P.L.C.

(57) ABSTRACT

An integrated cabin services system (CSS) for a mobile platform. The system may include a controller in communication with a plurality of remotely disposed cabin services subsystems for controlling each of the subsystems. A comprehensive database may be utilized by the CSS to employ combinational logic to control operation of the subsystems and to thus control the execution of at least one function of each of the subsystems. The comprehensive database may include a plurality of database portions, one database portion related to the controller and stored in the controller, and each one of the other database portions being related to a specific one of the subsystems, with each one of the other database portions being stored with its related said subsystem.

14 Claims, 2 Drawing Sheets

U.S. PATENT DOCUMENTS

| | | | |
|---|---|---|---|
| 6,393,343 B1 * | 5/2002 | Frey et al. | 701/3 |
| 6,719,245 B2 | 4/2004 | Wagner | |
| 6,748,597 B1 * | 6/2004 | Frisco et al. | 725/76 |
| 6,813,777 B1 * | 11/2004 | Weinberger et al. | 725/76 |
| 6,824,104 B2 | 11/2004 | Smallhorn | |
| 7,028,304 B1 * | 4/2006 | Weinberger et al. | 719/310 |
| 7,114,171 B2 * | 9/2006 | Brady et al. | 725/77 |
| 7,675,849 B2 * | 3/2010 | Watson et al. | 370/217 |
| 2003/0098661 A1 | 5/2003 | Stewart-Smith | |
| 2003/0217363 A1 | 11/2003 | Brady et al. | |
| 2004/0155609 A1 | 8/2004 | Lys et al. | |
| 2005/0053237 A1 * | 3/2005 | Hanson | 380/201 |
| 2005/0200937 A1 * | 9/2005 | Weidner | 359/275 |
| 2005/0278753 A1 | 12/2005 | Brady et al. | |
| 2005/0281223 A1 | 12/2005 | D'Annunzio | |
| 2007/0061847 A1 * | 3/2007 | Callahan et al. | 725/76 |
| 2009/0096857 A1 * | 4/2009 | Frisco et al. | 348/14.02 |
| 2010/0235866 A1 * | 9/2010 | Jangid | 725/76 |

OTHER PUBLICATIONS www.bitpipe.com; p. 1, Mar. 24, 2005.

www.avionicsmagazine.com; pp. 1 of 2 "Seven New Switching Modules", Jan. 1, 2001.

\* cited by examiner

CABIN SERVICES SYSTEM FOR A MOBILE PLATFORM

CROSS REFERENCE TO RELATED APPLICATIONS

This application is a continuation-in-part of U.S. patent application Ser. No. 10/670,952 filed on Sep. 25, 2003 (now abandoned). The disclosure of the above application is incorporated herein by reference in its entirety.

FIELD OF INVENTION

The present invention relates generally to cabin services systems for mobile platforms and more specifically to architecture for a mobile platform cabin services system.

BACKGROUND OF THE INVENTION

A cabin services systems (CSS) typically includes a plurality of different stand-alone subsystems, for example, audio communication, cabin lighting, information signs, and monitor and control subsystems. Known CSSs are usually designed for a unique implementation, such as for a specific mobile platform, and can vary greatly based upon the system or operation requirements for a particular mobile platform. The stand-alone subsystems typically include hard coded hardware line replaceable units (LRUs), logic implementations or software loadable, multiple bus type architectures. Implementation, or installation, of each stand-alone subsystem generally requires wiring that is specifically related to the particular stand-alone subsystem that runs the length of the mobile platform. This results in multiple wire bundles that run the length of the mobile platform and multiple standalone subsystems that each operate independent of each other to perform a single independent function. Additionally, many of stand-alone subsystems required different data bus types. That is, the various different stand-alone subsystems required different physical communications transmission mediums and different communications protocol that were specific to the particular stand-alone subsystem.

Additionally, known CSSs typically are not scalable, or easily reconfigured, to support mobile platforms having different cabin structures, seating capacities and desired subsystem functionality. For example, generally, CSSs are not scalable, or reconfigurable, for use with different mobile platforms having differing seating capacities, differing operational requirements and/or differing subsystems. To reconfigure contemporary CSSs typically requires change orders, testing, regulatory certification and comprehensive overhauls for each of the various different software applications, i.e. operating systems (OS), that control each of the various affected subsystems.

Furthermore, modifications to optimize contemporary CSSs typically results in implementation of unique data bus types and protocols within the various CSSs. Multiple proprietary data bus implementations within the same mobile platform increase total weight of the system, as well as increasing manufacture, installation and maintenance costs. The unique implementations also result in increased maintenance costs that occur when obsolescent parts need to be replaced and/or new functionality is added.

BRIEF SUMMARY OF THE INVENTION

In various embodiments of the present invention, an integrated cabin services system (CSS) is provided. The CSS includes a controller adapted to receive a plurality of mobile platform state inputs and a plurality of cabin service modules communicatively connected to the controller. Each of the modules has a plurality of attributes that are utilized to affect at least one CSS function. The CSS additionally includes a comprehensive database that includes a plurality of database portions. One database portion is related to the controller and stored thereon, and each of the other database portions are related to specific ones of the modules and stored in the related modules. The controller utilizes the comprehensive database to employ combinational logic to combine the received state inputs and output a state command to the related database portion of at least one of the modules. The related database portion generates an output utilized to affect the states of the related module attributes, thereby controlling the execution of at least one CSS function.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of various embodiments is merely exemplary in nature and is in no way intended to limit the invention, its application or uses. Additionally, the advantages provided by the various embodiments, as described below, are exemplary in nature and not all various embodiments provide the same advantages or the same degree of advantages.

Figure 1:
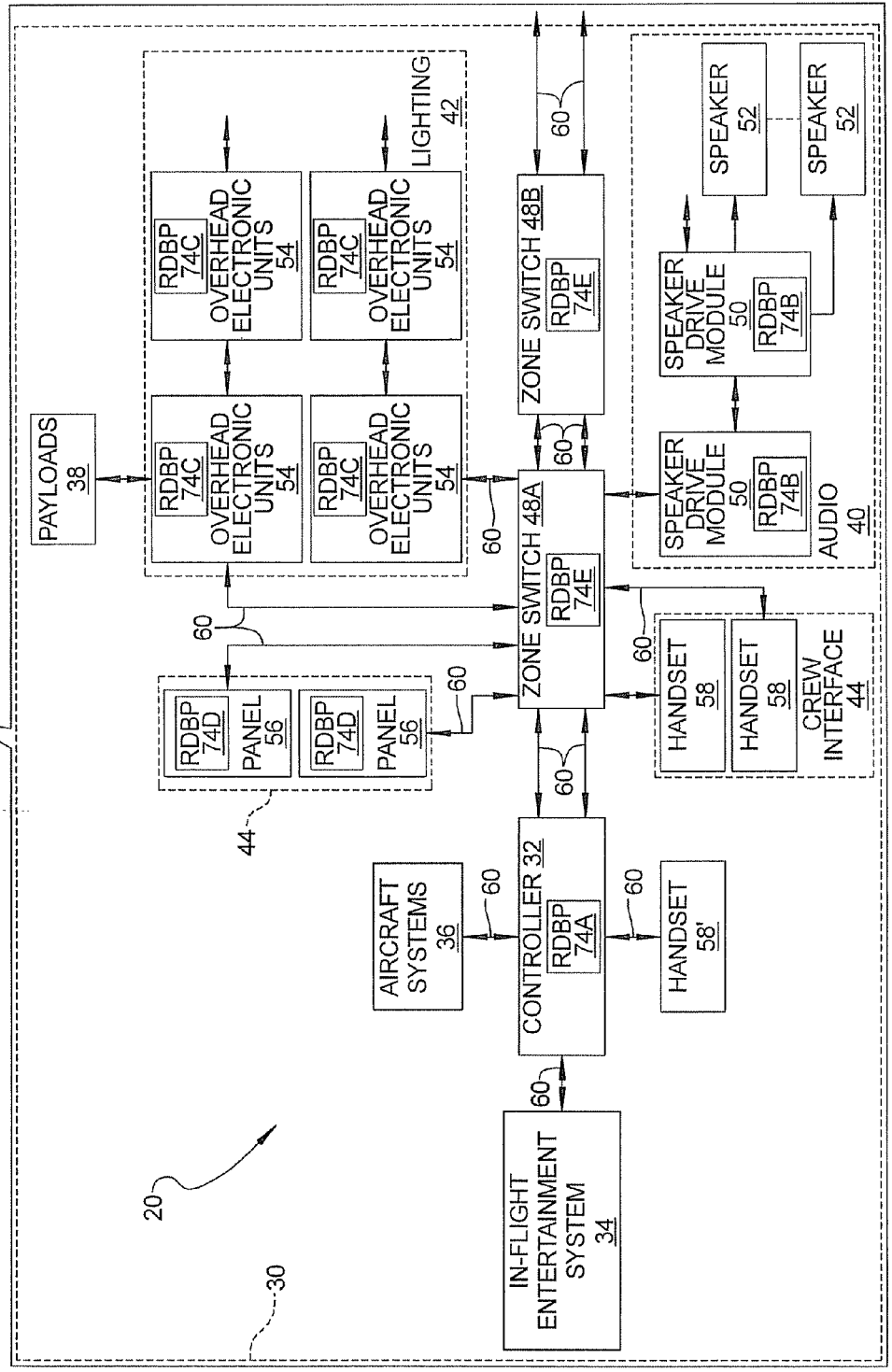
FIG. 1 is a block diagram of a cabin services system (CSS) architecture constructed in accordance with various embodiments of the present invention.

Referring to FIG. 1, in accordance with various embodiments of the present invention, a system architecture for a cabin services system (CSS) 20 of a mobile platform 31, such as an aircraft, is provided. The CSS 20 includes a single bus type for communicating throughout the CSS. The architecture is scalable for use in different environments, e.g., different types of mobile platform cabins, as desired or needed. It will be appreciated that while the present invention will be described herein in connection with an aircraft, that the invention could just as readily be used on virtually any form of mobile platform such as a bus, ship, train, etc. Accordingly, the invention should not be interpreted as being limited to an aircraft.

Generally, the CSS 20 controls all of the audio and the light operations within a cabin 30 of the mobile platform 31, e.g. aircraft. This includes, but is not limited to, control of cabin audio systems for use, for example in making announcements, control of crew intercommunication systems, and control of passenger lighting within the cabin 30 of the mobile platform. It should be noted that the audio and lighting functionality may be provided in connection with each individual seat, e.g., headphone interface with each passenger seat or overhead lighting for each passenger seat, or for portions of the cabin 30, e.g., speaker for use in public announcements. The CSS 20 also communicates with other systems on-board the aircraft 31 for use in controlling the audio and light operations. For example, the CSS 20 communicates with aircraft monitoring and control systems 36, e.g., air to ground systems, and in-flight entertainment systems 34, e.g., passenger video displays.

An exemplary embodiment of a CSS 20 architecture is shown is FIG. 1. The CSS 20 includes a controller 32, e.g., head end computing and audio resource controller, that communicates and/or provides an interface to control subsystems within the CSS 20. These subsystems include, but are not limited to, the in-flight entertainment subsystem 34, the aircraft monitoring and control subsystems 36, aircraft payloads subsystems 38, e.g., lavatories, galleys, closets, etc., one or more audio subsystems 40, one or more lighting subsystems 42 and various crew interface subsystems 44. With respect to the audio subsystems 40, lighting subsystems 42 and crew interface subsystems 44, the controller 32 is preferably connected thereto via at least one zone switch module 48, e.g., Ethernet switch or router, which provides data flow control between the subsystems 34, 36, 38, 40, 42 and 44, and between the controller 32 and the subsystems 34, 36, 38, 40, 42 and 44.

The audio subsystem 40 includes one or more programmable speaker drive modules (SDM) 50 for use in controlling audio operations within the cabin 30, such as speakers 52 for making public announcements to passengers within the cabin 30. The lighting subsystem 42 includes one or more programmable overhead electronic units (OEU) 54 for use in controlling lighting operations within the cabin 30. This may include, for example, control of passenger and/or galley lighting. The crew interface subsystems 44 include one or more programmable interface panels 56, e.g. a computer type touch screen, for use in selecting and operating various audio and lighting functions within the cabin 30. The crew interface subsystems 44 may also include one or more programmable handsets 58 for use, for example, in making public announcements within the cabin 30 or for communication between crew members at different locations within the cabin 30.

It should be noted that the number and location of the audio subsystems 40, lighting subsystems 42 and crew interface subsystems 44, and the components associated therewith may be modified as desired or needed for any particular mobile platform. For example, the interface panels 56 may be provided at different locations within the aircraft cabin depending upon the size and configuration, e.g., seating arrangement, of the aircraft cabin. Further, the one or more zone switch modules 48 may be provided as part of the CSS 20 as desired or needed. It should also be noted that the zone switch modules 48 may be connected in a daisy chain or series arrangement as shown in FIG. 1, or alternately, in a star or hub type arrangement depending upon, for example, system requirements.

Further, in various embodiments, busses 60 interconnecting the various components and subsystems 32, 34, 36, 38, 40, 42 and 44 within the CSS 20 may be four wire busses using IEEE 10/100 Base T Ethernet or other local area network (LAN) cable. The backbone of the CSS 20 from the controller 32 to the zone switch module 48a, and from zone switch module 48a to zone switch module 48b, may use two unique switched Ethernet busses, one for passenger address (PA) audio plus cabin data network and the other for cabin interphone (CI) network. The two networks are connected inside each zone switch module 48 to connect a handset 58 to the PA bus while the handset 58 is in PA mode and to connect the handset 58 to the CI bus when the handset 58 is in a CI mode. The PA mode enables each wired handset 58 to access the PA audio bus, for example, when making public announcements within the cabin 30. The CI mode enables each handset 58 to communicate with other handsets 58, for example, cabin crew can communicate between different locations within the cabin 30.

The busses 60 between the handsets 58 and the zone switch modules 48 may also be four wire busses using IEEE 10/100 Base T Ethernet or other four wire LAN cable with the handsets 58 being Voice over Internet Protocol (VoIP) ready to set up calls and initiate multicast sessions with a public announcement (PA) system within the cabin 30. It should be noted that each handset 58 receives power from the zone switch modules 48 and the power is passed over the busses 60, e.g., Ethernet wires, without the need for additional power wires. Further, it should be noted that a handset 58' in the flight deck, for example, for use by a pilot, operates in the same manner for PA announcements, except the handset 58' may be connected directly to the controller 32.

In operation, the routing of the VoIP signal is switched from the CI bus to the PA bus at the zone switch module 48 and provided directly to the speaker drive modules 50 without passing through the controller 32. Thus, every handset 58 has direct access to the speakers 52, e.g., PA speakers. Further, the zone switch module 48 routes the handset VoIP to a CI partition in the controller 32 to process calls. Specifically, a call manager for a cabin interphone system (CIS) resides in the controller 32 in the CI partition and provides the VoIP conference call functionality. In general, the call manager provides an operator function which includes directing, or routing, communication between the handsets. For communications between three or more handsets, the call manager sets up the communications between the handsets involved.

The CI partition can be from a commercial off the shelf application. The CIS operates, for example, with remote chimes, call lights, and minimum functionality for an "all call" for all installed handsets 58. The call lights and chimes replace a ringing function of the telephone. In case the attendants are away from the attendant stations when an incoming call arrives at their handset(s) 58, the cabin interphone uses the call lights and chimes through the cabin speakers to alert the attendants to the incoming calls.

Figure 2:
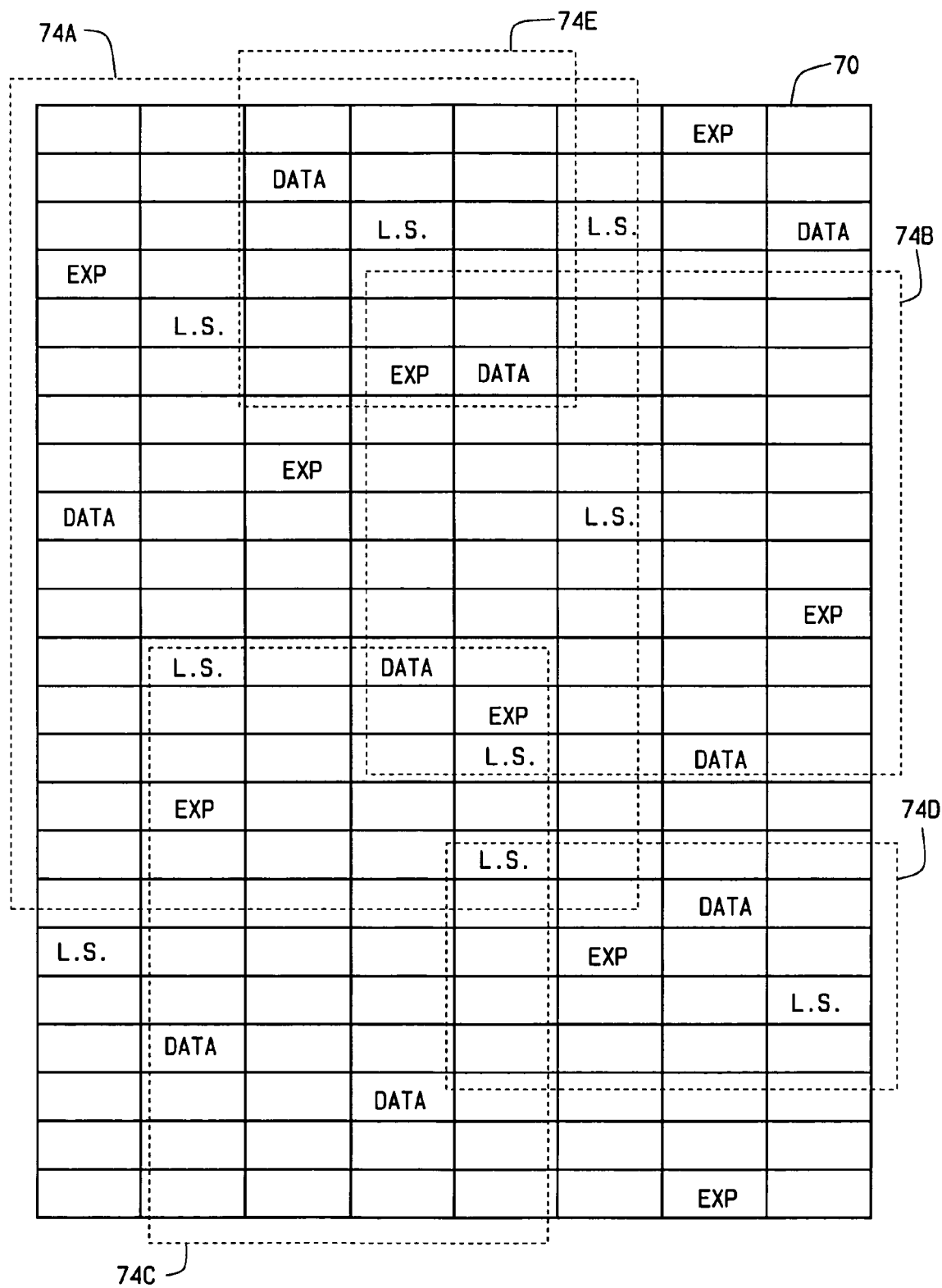
FIG. 2 is illustration of a master database utilized by the CSS shown in FIG. 1 to implement the use of combinational logic to control the functionality of various subsystems with the CSS.

Referring to FIG. 2, configuration data is used by the programmable modules, i.e. controller 32, zone switches 48, SDMs 50, OEUs 54, interface panels 56 and handsest 58 of the CSS 20 to provide the functionality of each of the subsystems 40, 42 and 44 of the CSS 20. The configuration data for CSS 20 is defined by a comprehensive database 70. The comprehensive database 70 is software loadable and is a single database utilized by the entire CSS 20. The comprehensive database 70 is populated with various types of data that can be implemented or operated on during the execution of combinational logic. For example, the comprehensive database 70 can include such data as numerical data (data), logic statements (LS) and/or expressions (EXP), e.g. state programs, algorithms and equations. Related database portions (RDBPs) 74 of the comprehensive database 70 are stored in the various programmable components, or modules, i.e. controller 32, zone switches 48, SDMs 50, OEUs 54, interface panels 56 and handsest 58, of the CSS 20. For example, the controller 32 will have a RDBP 74A stored therein, each SDM 50 will have a RDBP 74B stored therein, each OEU 54 will have a RDBP 74C stored therein, each crew interface panel 56 will have a RDBP 74D stored therein and each zone switch module 48 will have a RDBP 74E stored therein. Each of the RDBPs 74 can include data specific to the particular related programmable module 32, 48, 50, 54 and 56 and/or data common to one or more other RDBP 74. Thus, in various embodiments, the comprehensive database 70 is a single database that is not stored in a single programmable component, but rather includes portions, i.e. the RDBPs 74, that are stored in various programmable modules, e.g. components 32, 48, 50, 54 and 56, throughout the CSS 20.

Each SDM RDBP 74B, OEU RDBP 74C, crew interface panel RDBP 74D and the zone module RDBP 74E contains one or more fields that correspond to outputs of the controller RDBP 74A. The fields of each RDBP 74B, 74C, 74D and 74E are labeled in a manner corresponding to the output that it is pre-selected to receive from the controller 32. The respective programmable modules 50, 54, 56 and 48 use the fields in the corresponding RDBP 74B, 74C, 74D and 74E to define the action that the module will take when the output of an controller RDBP 74A, e.g. a "Fasten Seat Belt Sign Mode" function, changes state.

Each of the programmable modules 32, 48, 50, 54 and 56 has attributes specific to the particular programmable module 32, 48, 50, 54 and 56. The attributes are any function the specific module 32, 48, 50, 54 and 56 is capable of performing. Each of the programmable modules 32, 48, 50, 54, and 56 is assigned a unique identity that allows for loading the appropriate comprehensive database 70 section to each of the programmable modules 32, 48, 50, 54, and 56. That is, the programming for controlling the attributes of each programmable module 32, 48, 50, 54 and 56 is provided by the RDBP 74 stored on the respective programmable module 32, 48, 50, 54 and 56. More particularly, the controller 32 receives inputs from various mobile platform systems and subsystems, such as the IES 34, the aircraft monitoring and control system 36, the crew interface panels 56 and handsets 58 and 58'. These received inputs are utilized as inputs to the RDBP 74A of the controller 32, which then outputs one or more commands, also referred to as trigger states, to one or more of the programmable modules 48, 50, 54 and 56, based on the received inputs. The respective programmable modules 48, 50, 54 and 56 receive the head end unit commands and utilize the commands as inputs to the RDBP 74 stored thereon. Based on the commands input to the respective RDBP 74, the respective RDBP 74 outputs commands that control the attributes of the respective programmable module 48, 50, 54 or 56.

Therefore, comprehensive database 70 defines the physical usage of each input and output of the controller 32, the zone switches 48, the SDMs 50, the OEUs 54 and crew interface panels 56 and the logical affect that each input has on the CSS 20. The comprehensive database 70 can map any combination of inputs to any combination of outputs within CSS 20. The comprehensive database 70 maps the CSS 20 inputs via logical expressions or mathematical combinations of state(s) to apply the appropriate transaction for the required output(s) that define the functionality of programmable component(s) 32, 48, 50, 54 and 56 within the CSS 20. Thus, via the comprehensive database 70, the CSS 20 incorporates combinational logic to control that state of the various attributes of the various programmable modules 32, 48, 50, 54 and 56. The configuration data expressions may be provided to each module by Ethernet IP based communications that are carried by the same bus or LAN 60 that carries the digital audio for audio system.

For example, the zone switch module 48 routes lighting data and crew interface panel data to the controller 32 for use in controlling lighting operation within the cabin 30. Processing requirements for the zone switch module 48 is provided by the RDBP 74E and processing requirements for controlling functions of the OEUs 54 are provided by the respective RDBPs 74C. As a further example, each speaker drive module 50 and speaker 52 has various attributes, or functional capabilities, that are specific to the respective SDM 50 and speaker 52. For example, each speaker drive module 50 may be capable of being multicast enabled to provide the PA audio and each speaker 52 may be capable of producing audio for a predetermined number of PA areas within the cabin 30, e.g., areas having a set of passenger seats associated therewith.

These attributes are enabled and/or disabled via the respective speaker drive module RDBPs 74B in response to commands output from the controller RDBP 74A that are based on inputs to the RDBP 74A from the various CSS 20 systems and subsystems.

As a still further example, the OEUs 54 preferably drive light emitting diodes (LEDs) or other light sources, e.g., halogen lamps, for providing lighting within the cabin 30. For example, a digital interface to ballast/mood lighting is provided. Herein, the lighting sources are assumed to be smart, as are the devices within the other subsystems, or commandable, via a digital interface or bus. Thus, the present invention provides control of these light sources through the bus without point to point wiring between the OEUs 54 and the lighting sources. Particularly, each SDM 50 and/or OEU 54 has an associated function or expression in the controller RDBP 74A and/or the respective OEU and SDM RDBPs 74C and 74B that control the respective OEU 54 and/or SDM 50. For instance, programmable signs may be programmed to enable a particular state event, i.e., display a given sign, such as a "Fasten Seat Belt" sign. Moreover, a "Fasten Seat Belt" logical expression, i.e., state program, that controls the "Fasten Seat Belt" state event of the OEUs 54 may be defined as having two modes, off and on. An exemplary logical expression or state program for determining the state of the LEDs that illuminate the "Fasten Seat Belt" sign may be defined as:

Fasten Seat Belt Sign=(Fasten Seat Belt Switch=ON)
        OR ((Fasten Seat Belt Switch=Auto) AND
        (Landing Gear extended OR Cabin Pressure>{a
        Value in RDBP 74A and/or RDBP 74B and/or
        RDPB 74C} OR Aircraft Altitude<{a Value in
        RDBP 74A and/or RDBP 74B and/or RDPB
        74C})) OR (Fasten Seat Belt Switch=OFF).

The operands in the parenthesis ( ) represent mobile platform state information that may be digital data received by the systems and subsystems of the CSS 20, e.g. the monitoring and control system 36, the IES 34, the crew interface panels 56 and/or the crew or pilot handsets 58 and 58'. In contrast, the operands in the brackets {} are data entries that are defined within the comprehensive database 70 for each of the functions.

The logical expression, or state program, "Fasten Seat Belt Sign" shown above generates an output of the controller RDBP 74A that is used as in input to the OEU RDBP 74C and/or the SDM RDBP 74B to control the "Fasten Seat Belt" sign and/or related audio sound affects. That is, the expression or function resides in the RDBP 74A of the controller 32. Accordingly, the controller 32 periodically, or asynchronously, calculates its outputs, which in this example includes execution of the "Fasten Seat Belt Sign" function. Depending on where the components associated with the function reside, the controller 32 may then transmit the result to the programmable components dictated by the RDBP 74A over one or more of the data buses 60. The data buses 60 throughout the CSS 20 comprise a single physical communication medium type, e.g. Ethernet, that communicate data throughout the CSS 20 utilizing a single communications protocol, e.g. an Internet protocol (IP). Thus, via the incorporation of combinational logic, communication is performed throughout the entire CSS 20 using a common backbone that comprises a single communication medium type and a single communications protocol.

In an alternative scenario of the present example, if a pilot or crew member manually changes the position of a "Fasten Seat Belt" switch, the controller 32 receives a signal indicative of the new switch position and utilizes the RDBP 74A to determine the output of the "Fasten Seat Belt Sign" function that the pre-programmed RDBP 74A dictates should result from the new switch setting. The controller 32 then transmits a new state command to all of the programmable components 48, 50, 54 and/or 56 that the pre-programmed RDBP 74A dictates should receive the new state command and thereby alter their respective states, i.e. change the state of their respective attributes. Thereafter, the respective RDBPs 74B, 74C, 74D and/or 74E dictate how the respective programmable module states should change or respond in accordance with the new state command from the controller 32. For example, in addition to the new state command being communicated to the OEUs 54, the RDBP 74A may dictate that a new state command also be communicated to the SDMs 50 that will have a RDBP 74B entry that also maps the "Fasten Seat Belt Sign" function to alter the state of one or more SDM 50 attributes. Thus, via the incorporation of combinational logic, the "Fasten Seat Belt Sign" function of the controller RDBP 74A is executed and the controller 32 outputs state commands to the OEUs 54 and the SDMs 50. In response thereto, the OEUs 54 change the state of the LED's that illuminate all or selected ones of the "Fasten Seat Belt" signs, and the SDMs 50 also respond with outputs to drive pre-selected speakers 52 to output a sound, for instance chime sounds.

Alternatively, when the pilot or crew member manually changes the position of the "Fasten Seat Belt" switch the SDMs 50 can be commanded to sound a chime sound, via the controller RDBP 74A, as described above. The chime sound may be an indicator for a crew member to change the state of the "Fasten Seat Belt" sign, via the crew interface panel 56. Accordingly, a signal would be sent from the crew interface panel 56 to the controller 32 to change the state of the "Fasten Seat Belt" function. In response to receiving the signal from the crew interface panel 56, the controller 32 utilizes the RDBP 74A to command the OEUs 54 to change the state of one or more related attributes, e.g. alter the state of the LED's of the "Fasten Seat Belt" sign, as described above. Thus, the CSS 20 may audibly alert the crew and passengers to the change of state of the "Fasten Seat Belt" signs via the crew interface panels 56.

In various embodiments, the speaker drive modules 50 include a resident priority manager for use in operating the speakers 52, for example when making cabin announcements of different priorities. For instance, the priority manager prioritizes announcements from the flight deck as having the highest priority. Then in descending order, the priority manager prioritizes announcements from the attendants, recorded announcements, and boarding music. Accordingly, the priority manager overrides lower priority announcements with higher priority announcements. The RDBPs 74B include data, e.g. expressions and/or logic statements, that the priority manager uses to compare incoming announcements with the types of announcements that the particular speaker 52 is pre-selected to announce. Accordingly, the speakers 52 provided by the present invention provide announcements based on these pre-selection or state programs.

Generally, each of the programmable modules 48, 50, 54 and 56 receive controller 32 outputs over the data buses 60.

The individual programmable modules 48, 50, 54 and/or 56 then respond to the controller 32 outputs as the respective programmable module 48, 50, 54 and/or 56 is programmed to respond, i.e. as the respective RDBP 74 dictates. Thus, for example, the "Fasten Seat Belt" signs may turn on or off in accordance with the change in state discussed above, and the SDMs 50 may drive the speakers 52 with a chime. More particularly, the CSS 20 is a single integrated system that synchronizes the operation of all systems and subsystems 32, 34, 36, 40, 42, 44 and 48. Specifically, the CSS 20 is a single integrated system that implements combinational logic, via the comprehensive database 70, to control the states of all the attributes of all the modules 32, 48, 50, 54, 56 58 and 58'. For example, the controller 32 synchronizes and calculates the states of each programmable module 48, 50, 54 and 56, while each programmable module 48, 50, 54 and 56 simultaneously monitors the states of its own respective attributes and controls these states based on commands from the controller 32.

Alternatively, the controller 32 can have the entire comprehensive database 70 stored thereon and thereby implement combinational logic to directly control the states of the attributes of all the components 32, 40, 42, 44, and 48. That is, the components 32, 40, 42, 44 and 48 are effectively 'slave' components that are directly controlled by the 'master' controller 32, via that comprehensive database 70 entirely stored thereon.

In various embodiments, the state data is automatically sent from the CSS 20 systems, such as the monitoring and control system 36 and/or the IES 34, to the controller 32 on a periodic basis. For example, every 20-100 milliseconds the controller receives updated state data from the monitoring and control system 36 and/or the IES 34. In response to each state data update, the controller 32 determines the combinational logic statements of the comprehensive database 70 defined by those state data, i.e. the combinational logic statements having those state data as inputs. The controller 32 then recalculates and automatically sends new state commands to the appropriate modules 48, 50, 54 and/or 56.

Although the example above have related to a specific "Fasten Seat Belt" state program, it should be understood that all cabin services are controlled via the comprehensive database 70 as described in the above "Fasten Seat Belt" example. For example, a "Wakeup Passenger" lighting state program, where the illumination intensity of the cabin lights is slowly increased from near dark to full lighting, or a "Boarding" audio state program, where particular music and greetings are played during passenger boarding, is automatically and/or manually activated in similar fashion to the "Fasten Seat Belt" state program described above. Or, the determination of which selectable buttons are displayed on crew interface panels 56 and the selectable buttons orientation and meaning, or any other lighting and audio state program implemented by the CSS 20 is automatically and/or manually activated in similar fashion to the "Fasten Seat Belt" state program described above.

Furthermore, through the combinational logic, the comprehensive database 70 can combine the attributes of the entire CSS 20 to get a desired effect. For instance, the combinational logic could start a "Wake Up Lighting" state program that changes the cabin lighting from night mode to breakfast mode over a period of fifteen minutes, while at the same time defining a "Lighting Color" state program to transition from a dark purple light to a bright yellow light. Substantially simultaneously, the PA system could be activated start playing music of birds chirping. Or, the combinational logic in the comprehensive database 70 could trigger a "Start Breakfast" state program that activates soft music playing over the PA and simultaneously turns on or off various lighting throughout the cabin 30.

More particularly, every state program is defined by the comprehensive database 70 such that the state event controlled by the state program is definable within the comprehensive database 70. Therefore, the functionality of each state program and therefore the manner of execution or performance of the state events of each module 32, 48, 50, 54 and 56 can be changed, modified and altered by merely changing the numerical data (data), logic statements (LS) and/or expressions (EXP), e.g. state programs, algorithms and equations programmed into the comprehensive database 70. Moreover, each component 48, 50, 54 and 56 can be defined to have different attributes, i.e. functionality, from one aircraft to the next. That is, the CSS 20 on every aircraft is effectively the same, but the functionality of the CSS 20 can be different based on the particular data, e.g. numerical data (data), logic statements (LS) and/or expressions (EXP), programmed into the comprehensive database 70. Thus, modules 48, 50, 54 and 56 can be generic line replaceable units (LRUs) and the comprehensive database defines the functionality of each module 48, 50, 54 and 56. Thus, the functionality of the controller 32, the zone switch modules 48, the SDMs 50, the OEUs 54, the crew interface panels 56 and the handsets 58 and 58' can be dynamically changed by just changing the data programmed into the comprehensive database 70.

The controller 32 can receive combinations of inputs and via combinational logic employed using the comprehensive database 70, combine the inputs to control the state events executed by the controller 32 the zone switches 48, the SDMs 50, the OEUs 54 and the crew interface panels 56. The inputs can be any manual input by the crew and/or any automatically monitored state of the aircraft such as flap positions, landing gear status, speed of the aircraft, altitude of the aircraft, flight phase, date and/or time. The data programmed into the comprehensive database 70 can be changed from one aircraft to the next such that functionality of the controller 32 the zone switches 48, the SDMs 50, the OEUs 54 and the crew interface panels 56 can be changed as desired for each specific aircraft.

Turning now to another preferred embodiment, a CSS 20 is provided that includes the following:

(1) A wired backbone consisting of IEEE 10/100 Base T Ethernet or other LAN between the controller 32 and zone switch modules 48 selectively distributed throughout the cabin 30 to optimize wiring;

(2) Standard IP based protocol with VoIP used for all audio;

(3) Dedicated switched Ethernet busses 60 between zone switch modules 48 and each of the audio subsystem 40, the lighting subsystem 42 and the crew interface subsystems 44;

(4) VoIP enabled handsets 58 connected in a daisy chain or star configuration to the zone switch modules 48;

(5) Audio announcements originating from the flight deck, e.g., using the flight deck handset 58', and cabin handsets 58 provided by multicasting audio stream to speakers 52 and the in-flight entertainment system 34 using the same bus 60 as cabin lighting, and monitor and control for other subsystems;

(6) Handset 58 to handset 58 communications using a dedicated bus and VoIP to provide all cabin station to station calls, conference calls, or all handset calls with a single dial code entry; and (7) Cabin panels 56 configured as web browsers that can control cabin lighting, and monitor and control other cabin features.

Thus, various embodiments of the present invention provide a CSS 20 that is scalable, for example, for use in aircraft of different sizes, and that is more cost and weight effective. The CSS 20 achieves single system architecture. i.e., all busses 60 being of the same type, for the backbone of all CSS 20 subsystems. This minimizes data bus types and reduces the cost of, for example, subsystem auto test features and improves software load capabilities. The CSS 20 eliminates the need for proprietary protocols and leverages current audio and data technologies. The CSS 20 provides functionality upgrade capability through the use of comprehensive database 70 and leverages the throughput capability of a standard IP based bus architecture. The CSS 20 enables conference calling capability for a plurality of users, e.g., more than twenty five callers, using VOIP.

More particularly, the CSS 20 incorporates a common backbone throughout and utilizes combinational logic to control all components, e.g. every OEU 54 and every SDM 50, using one system that utilizes operational software to access the data tables. Therefore, changes to the functionality of any component can be accomplished by merely changing data and/or logic expressions in the database without having to change operational software. The CSS 20 utilizes a single set of logic. That is, the head end computing resource 32, the OEUs 50, the SDMs 54 and all other switch modules of the CSS 20 are operated and controlled using a single logic set. The logic set is a definable data base that is utilized to implement combinational logic to control the functionality of all the OEUs 50, the SDMs 54 and all other switch modules of the CSS 20. For example, cabin lighting, cabin audio, cabin information signing, cabin temperature, galley functions, lavatory functionality and the waste tank water indicators are all controlled using a single system having one data bus structure that utilizes one operating system that incorporate the comprehensive database 70. Thus, through the implementation of a single database, i.e. the comprehensive database 70, and a single backbone the CSS 20 combines all of the systems and subsystem of CSS 20, that are traditionally stand-alone systems and, therefore controls the operation and functionality of all the systems and subsystems as a single integrated entity or system.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An integrated cabin services system (CSS) for a mobile platform, said system comprising:
   a controller;
   a plurality of cabin services subsystems communicatively connected to the controller, the cabin services subsystems being located remote from the controller, each of the subsystems having a plurality of attributes for affecting a plurality of functions of the cabin services subsystems;
   a comprehensive database utilized by the CSS to employ combinational logic to control operation of the subsystems and to thus control the execution of at least one function of each of the subsystems; and
   the comprehensive database including a plurality of database portions, one database portion related to the controller and stored in the controller, and each one of the other database portions being related to a specific one of the subsystems, with each said one of the other database portions being stored with its related said subsystem; and each of said other database portions further being configured to receive a specific, associated output from the one database portion related to the controller to enable each said cabin services subsystem to carry out a specific function assigned thereto;

a zone switch interposed between the controller and at least a subplurality of the subsystems; and the zone switch having one of said other database portions stored therein, including one or more fields corresponding to an output from said database portion related to the controller, the zone switch further adapted to receive a pre-selected output from the controller that defines an action of the zone switch;

a first switched network bus and a second switched network bus incorporated within the zone switch for enabling either of two selectable, independent network communications paths to be formed through the zone switch; and wherein the controller is further adapted to receive a plurality of mobile platform inputs regarding operation of the mobile platform and to utilize the comprehensive database to employ the combinational logic to combine the mobile platform inputs and to generate an output for the zone switch and one or more of the subsystems based on the combined mobile platform inputs.

2. The system of claim 1, wherein the plurality of cabin services subsystems comprise at least two of a plurality of speaker drive modules, a plurality of overhead electronic units, a plurality of crew interface panels and a plurality of audio system handsets.

3. The system of claim 1, wherein the comprehensive database is dynamically programmable such that the combinational logic used to control the subsystems can be dynamically changed to alter the execution of operations of the CSS for each of the subsystems without modifying hardware of the CSS.

4. The system of claim 1, wherein execution of multiple functions by the subsystems is substantially simultaneously controlled using the comprehensive database.

5. The system of claim 1, wherein the comprehensive database includes at least one of numerical data, logic statements and programs.

6. The system of claim 1, wherein the subsystems are adapted to utilize the output as an input to their respective said subsystem related portions of the comprehensive database to generate an output from their respective said subsystem related portions of the comprehensive database.

7. A method for controlling execution of a mobile platform integrated cabin services system (CSS), said method comprising:

receiving as inputs to a CSS comprehensive database, a plurality of mobile platform subsystem inputs, at least one of said mobile platform subsystem inputs including an input related to an operational state of the mobile platform;

utilizing the comprehensive database to employ combinational logic to generate a command by a controller based on the received inputs, wherein the comprehensive database includes at least a subplurality of:
  numerical data;
  logic statements; and
  programs;

utilizing the command to control operation of a plurality of attributes of a plurality of cabin services subsystems located remotely from the controller, to control execution by the subsystems of a plurality of different operations of the CSS;

storing portions of the comprehensive database in each of the controller and the cabin services subsystems, each said portion of the comprehensive database being associated with a respective one of the controller and the subsystems;

said portions of the comprehensive database that are stored in the cabin services subsystems further being configured to receive a specific output from the database portion associated with the controller, each said specific output being constructed using combinational logic from at least the subplurality of the numerical data, the logic statements and the programs, to enable each said comprehensive database portion being used with each one of the cabin services subsystems to control a specific operation of each said cabin services subsystem assigned thereto, in a coordinated manner, in accordance with the mobile platform inputs; and placing a zone switch in communication with the controller and at least a subplurality of the cabin services subsystems; and incorporating a first switched network bus and a second switched network bus within the zone switch for enabling either one of two selectable network communications paths to be formed through the zone switch.

8. The method of claim 7, wherein the cabin services subsystems comprise at least two of:
  a plurality of speaker drive modules,
  a plurality of overhead electronic units,
  a plurality of crew interface panels;
  and a plurality of audio system handsets.

9. The method of claim 7, wherein the comprehensive database is dynamically programmable such that the combinational logic used to control the subsystems can be dynamically changed to alter the execution of the operations of the CSS without modifying hardware of the CSS.

10. The method of claim 7, wherein said utilizing the comprehensive database to employ combinational logic to control the subsystems comprises substantially simultaneously controlling the subsystems to effect execution of multiple operations of the CSS.

11. A mobile platform comprising:
an integrated cabin services system (CSS) including:
  a controller adapted to receive a plurality of inputs regarding operation of a mobile platform, the inputs comprising:
    an input from a crew member; and
    a state of a monitored subsystem of the mobile platform;
  a plurality of cabin service subsystems located remotely from the controller and communicatively connected to the controller, each of the subsystems having a plurality of attributes for carrying out at least one function; and
  a comprehensive database comprising a plurality of database portions, one database portion being related to the controller and stored thereon, and each of the other database portions being related to specific ones of the subsystems and located at its associated said subsystem;
  the controller being further adapted to utilize the comprehensive database to employ combinational logic to combine the received inputs concerning the mobile platform, and to output commands to the related database portion of each one of a plurality of the subsystems to control execution of operations of the CSS by each one of the subsystems;

the controller further adapted to utilize the comprehensive database to employ the combinational logic to combine the received inputs from the mobile platform and to output commands to the related database portions of a plurality of the subsystems to cause the plurality of the subsystems to generate outputs from related database portions thereof to substantially simultaneously control the execution of operations of the CSS in a coordinated manner, taking into account the plurality of inputs regarding the operation of the mobile platform; and a zone switch module in communication with the controller and enabling the controller to be interfaced to the subsystems, the zone switch module including first and second selectable network communications busses for enabling two distinct communication paths, one being to implement a passenger address mode of operation, and the other to implement a cabin interface mode of operation, to be provided.

12. The mobile platform of claim 11, wherein the cabin services subsystems comprise at least two of:
   a plurality of speaker drive modules,
   a plurality of overhead electronic units,
   a plurality of crew interface panels; and
   a plurality of audio system handsets.

13. The mobile platform of claim 11, wherein the comprehensive database is dynamically programmable such that the combinational logic used to control the operation of the subsystems can be dynamically changed to alter the execution of operations of the CSS without modifying the CSS.

14. The mobile platform of claim 11, wherein the comprehensive database includes numerical data, logic statements and programs.

* * * * *